United States Patent
Kuo et al.

(10) Patent No.: US 11,715,433 B2
(45) Date of Patent: *Aug. 1, 2023

(54) DISPLAY DEVICE AND ASSEMBLING METHOD THEREOF

(71) Applicant: INNOLUX CORPORATION, Miao-Li County (TW)

(72) Inventors: Chung-Chun Kuo, Miao-Li County (TW); Chun-Fang Chen, Miao-Li County (TW); Hui-Wen Su, Miao-Li County (TW); Wei-Yuan Chen, Miao-Li County (TW); Chung-Yu Cheng, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/667,994

(22) Filed: Feb. 9, 2022

(65) Prior Publication Data

US 2022/0172686 A1 Jun. 2, 2022

Related U.S. Application Data

(63) Continuation of application No. 17/164,057, filed on Feb. 1, 2021, now Pat. No. 11,282,465, which is a continuation of application No. 16/400,494, filed on May 1, 2019, now Pat. No. 10,943,550.

(30) Foreign Application Priority Data

May 9, 2018 (CN) .......................... 201810436224.5

(51) Int. Cl.
*G09G 3/34* (2006.01)
*F21V 8/00* (2006.01)
*G02B 6/42* (2006.01)

(52) U.S. Cl.
CPC ......... *G09G 3/3473* (2013.01); *G02B 6/0068* (2013.01); *G02B 6/4239* (2013.01)

(58) Field of Classification Search
CPC ... G09G 3/3473; G02B 6/0068; G02B 6/4239
See application file for complete search history.

(56) References Cited

U.S. PATENT DOCUMENTS

| 2014/0376261 | A1* | 12/2014 | Liu | ...................... G02B 6/0031 362/609 |
| 2015/0002783 | A1* | 1/2015 | Park | ...................... G02B 6/0076 349/64 |

(Continued)

*Primary Examiner* — Sejoon Ahn
(74) *Attorney, Agent, or Firm* — Muncy, Geissler, Olds & Lowe, P.C.

(57) ABSTRACT

A light-emitting assembly includes a substrate and a plurality of light-emitting elements. The substrate includes a component arrangement region and a planar region in a top view, and includes a base material layer, a filled layer and a protection layer in a sectional view. A thickness of the filled layer is greater than a thickness of the protection layer. The thickness of the protection layer is greater than 0 μm and less than 30 μm. The plurality of light-emitting elements are located on the component arrangement region. This disclosure can improve the non-uniform brightness issue (hotspots) or enhance the optical performance.

16 Claims, 8 Drawing Sheets

(56) References Cited

U.S. PATENT DOCUMENTS

2015/0048532 A1* 2/2015 Yoon .................... B29C 59/021
                                                          264/1.24
2015/0049506 A1* 2/2015 Lee ....................... G02B 6/002
                                                          362/608

* cited by examiner

DISPLAY DEVICE AND ASSEMBLING METHOD THEREOF

CROSS REFERENCE TO RELATED APPLICATIONS

This application is a Continuation Application (CA) of an earlier filed, pending, application having application Ser. No. 17/164,057 and filed on Feb. 1, 2021, which is a Continuation Application (CA) of Ser. No. 16/400,494 and filed on May 1, 2019, which claims priority under 35 U.S.C. § 119(a) on Patent Application No(s). 201810436224.5 filed in People's Republic of China on May 9, 2018, the entire contents of which, including drawings, are hereby incorporated by reference.

BACKGROUND

Technical Field

The present disclosure relates to a display device and an assembling method thereof that can improve the non-uniform brightness issue (hotspots).

Related Art

In the recent years, the manufacturing processes and materials of light-emitting diodes (LEDs) have been developed and improved, so the light-emitting efficiency of LEDs is sufficiently increased. Different from the general fluorescent lamps or compact lamps, the LEDs have the properties such as low power consumption, long lifetime, high safety, short lighting response time, and small volume. Accordingly, the LEDs have been used in the illumination application, such as the indoor lamps, flashlights, headlights for vehicles, or other lighting devices, or in the backlight module of flat display displays.

For example, the LEDs can be used in the edge-type backlight module of a liquid crystal display (LCD) device. Generally, the edge-type backlight module includes a light-emitting assembly and a light-guiding plate disposed correspondingly to the light-emitting assembly. The light-emitting assembly is, for example, an LED light bar, which is located on the side of the light-guiding plate and emits light into the light-guiding plate. The function of the light-guiding plate is to guide the transmission direction of light and to provide a uniform surface light source by total reflection of the light-guiding plate.

In the design of current light-emitting assembly, a groove is formed on the front side of the light-emitting element, so that the traces or electrical conductive film layers in different electrical properties can be electrically isolated from each other. However, the groove can easily cause bubbles in the adhesive member. The bubbles can make the adhesive member be peeled off, and the light-guiding plate cannot be fixed, resulting in a non-uniform brightness issue (hotspots) or affecting the optical performance.

SUMMARY

An objective of this disclosure is to provide a display device and an assembling method thereof that can improve the non-uniform brightness issue (hotspots) or enhance the optical performance of the display device.

This disclosure provides a display device comprising a backlight module. The backlight module comprises a light-guiding plate, a light-emitting assembly and an adhesive member. The light-emitting assembly is disposed correspondingly to the light-guiding plate and comprises a substrate and a plurality of light-emitting elements. The substrate comprises a first surface, and the first surface comprises a component arrangement region and a planar region. A first gap is formed between the planar region and the component arrangement region, and the planar region and the component arrangement region are electrically isolated from each other. The light-emitting elements are disposed on the component arrangement region. The adhesive member connects the light-guiding plate and the planar region.

This disclosure also provides as assembling method of a display device, comprising: providing a light-guiding plate; providing a light-emitting assembly disposed correspondingly to the light-guiding plate, wherein the light-emitting assembly comprises a substrate and a plurality of light-emitting elements, the substrate comprises a first surface, the first surface comprises a component arrangement region and a planar region, a first gap is formed between the planar region and the component arrangement region, the planar region and the component arrangement region are electrically isolated from each other, and the light-emitting elements are disposed on the component arrangement region; disposing an adhesive member on the planar region or the light-guiding plate; and connecting the light-guiding plate and the planar region of the substrate by the adhesive member.

As mentioned above, in the display device and assembling method thereof of this disclosure, the first surface of the substrate of the backlight module comprises a component arrangement region and a planar region, the planar region and the component arrangement region are electrically isolated from each other by a gap disposed therebetween, and the adhesive member connects the light-guiding plate and the planar region. Since the planar region of the substrate is substantially a planar structure, the bubbles can be prevented to be formed in the adhesive member so as to obtain a substantially planar surface. Accordingly, after the light-guiding plate is disposed on the adhesive member, the adhesive member will not be easily peeled, thereby solving the non-uniform brightness issue (hotspots) or enhancing the optical performance.

BRIEF DESCRIPTION OF THE DRAWINGS

The embodiments will become more fully understood from the detailed description and accompanying drawings, which are given for illustration only, and thus are not limitative of the present disclosure, and wherein.

DETAILED DESCRIPTION OF THE DISCLOSURE

The embodiments of the disclosure will be apparent from the following detailed description, which proceeds with reference to the accompanying drawings, wherein the same references relate to the same elements.

The component substrates, display devices, and manufacturing methods of the display device according to some embodiments of this disclosure will be described hereinafter. To be noted, the following examples show different aspects of some embodiments of this disclosure. The specific elements and arrangements described below are merely illustrative of some embodiments of the present disclosure. Of course, these are used as examples and not as a limitation of the present disclosure. Moreover, repeated reference numbers or labels may be used in different embodiments. These repeated reference numbers or labels are merely illustrative of some embodiments of the present disclosure and are not intended to represent any relationships of the various discussed embodiments and/or structures. Furthermore, when describing that a first material layer is disposed on or above a second material layer, the first material layer can be in direct contact with the second material layer. Alternatively, this description is also possible to be realized as having one or more material layers interposed between the first material layer and the second material layer, in which case the first material layer and the second material layer are not in direct contact with each other.

With regard to "approximately" as used in this disclosure, the error or range of the value is generally within 20 percent, preferably within 10 percent, and more preferably within 5 percent, 3 percent, 2 percent, 1 percent, or 0.5 percent. In the absence of a clear statement in the disclosure, the values mentioned are all considered to be approximate values. That is, the values mentioned have an error or range represented by "approximately".

Figure 1A:
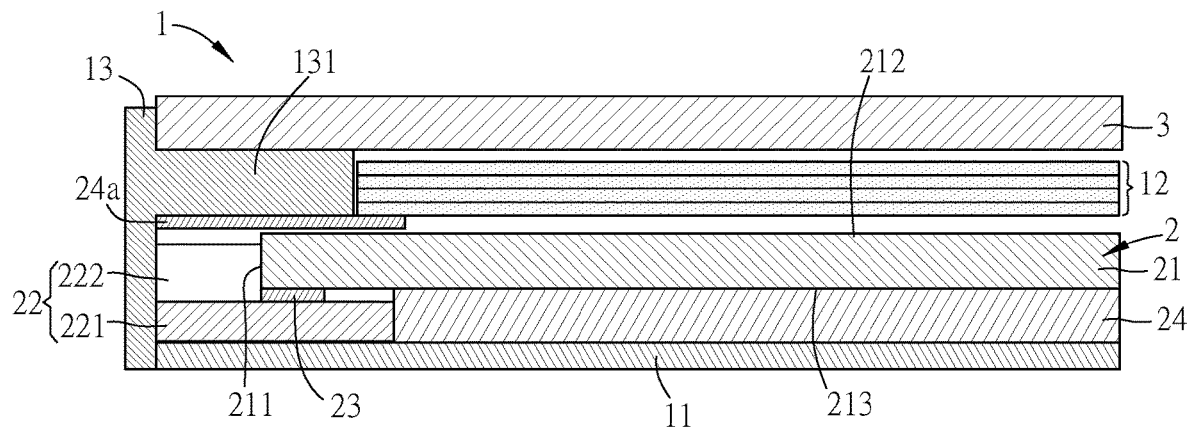
FIG. 1A is a sectional view of a display device according to an embodiment of this disclosure.
Figure 1B:
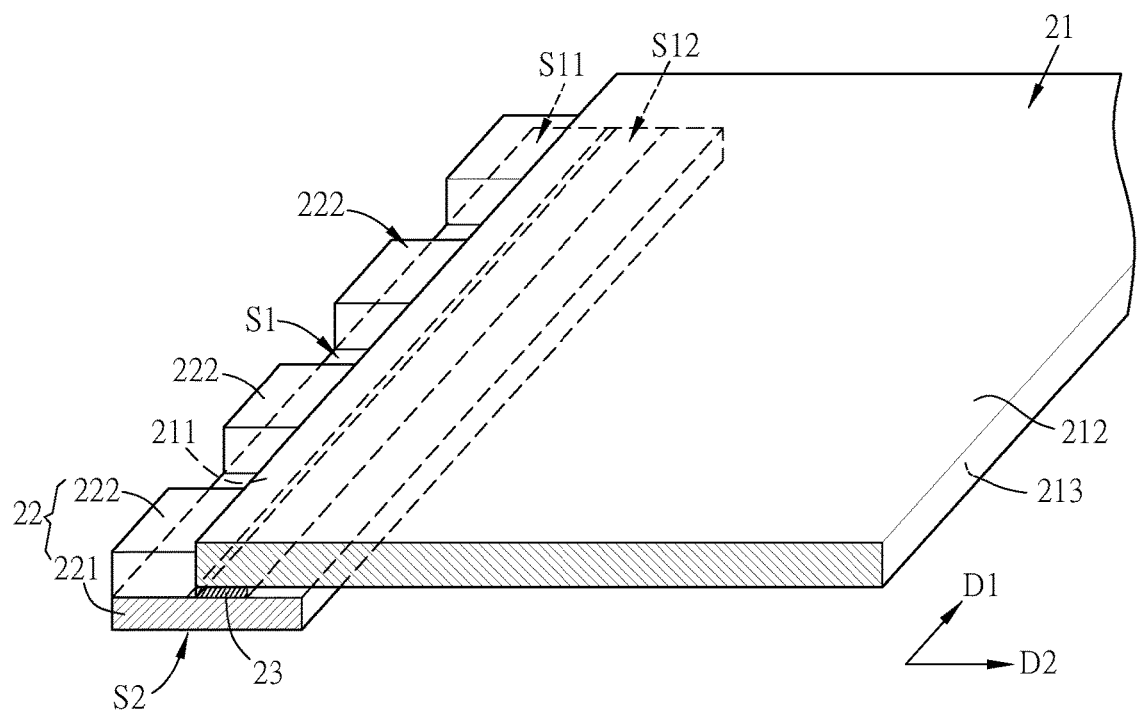
FIG. 1B is a schematic perspective diagram showing a light-emitting assembly and a light-guiding plate of the display device of FIG. 1A.

FIG. 1A is a sectional view of a display device according to an embodiment of this disclosure, and FIG. 1B is a schematic perspective diagram showing a light-emitting assembly and a light-guiding plate of the display device of FIG. 1A.

As shown in FIGS. 1A and 1B, a display device 1 comprises a backlight module 2 and a display panel 3, which are disposed correspondingly to each other. The light emitted from the backlight module 2 can pass through the display panel 3 to display an image.

The backlight module 2 comprises a light-guiding plate 21, a light-emitting assembly 22 and an adhesive member 23. The light-emitting assembly 22 is disposed correspondingly to the light-guiding plate 21. The light-guiding plate 21 has a light input surface 211 and a light output surface 212. For example, the light emitted from the light-emitting assembly 22 can enter the light-guiding plate 21 through the light input surface 211, and exit the light-guiding plate 21 through the light output surface 212. The light-guiding plate 21 comprises a transparent material, such as acrylic resin, polycarbonate, polyethylene resin or glass, and this disclosure is not limited thereto. In addition, the cross-section shape of the light-guiding plate 21 can be, for example, rectangular or a wedge shape. In this embodiment, the light-guiding plate 21 has a rectangle shape. To be noted, in other aspects, another light-emitting assembly (not shown) can be provided at an opposite side of the light input surface 211 of the light-guiding plate 21, so that the lights emitted from the two light-emitting assemblies can pass through the opposite light input surfaces, respectively, to enter the light-guiding plate 21. This disclosure is not limited.

The light-emitting assembly 22 comprises a substrate 221 and a plurality of light-emitting elements 222. The substrate 221 can be a flexible circuit substrate, a printed circuit board, a rigid-flex board, or any of other suitable substrates. In this embodiment, the substrate 221 is a flexible circuit substrate, such as a flexible printed circuit (FPC) board. The flexible circuit substrate can comprise, for example but not limited to, polyimide (PI). The substrate 221 comprises a first surface S1 and a second surface S2 disposed correspondingly to the first surface S1 (see FIG. 1B). In this embodiment, the first surface S1 can be the upper surface (front surface) of the substrate 221, and the second surface S2 can be the lower surface (rear surface) of the substrate 221. The light-emitting elements 222 are disposed on the substrate 221 along the direction D1. In this embodiment, as shown in FIG. 1B, the direction D1 is parallel to the light input surface 211 of the light-guiding plate 21. The light-emitting elements 222 are separately disposed on the first surface S1 of the substrate 221 along the direction D1. The light-emitting elements 222 comprise light-emitting diodes (LEDs), organic light-emitting diodes (OLEDs), micro light-emitting diodes (micro LEDs), or mini light-emitting diodes (mini LEDs). In this embodiment, the light-emitting elements 222 are LED light bar for example. In some embodiments, the chip size of the LEDs approximately ranges from 300 μm to 10 mm, the chip size of the mini LEDs approximately ranges from 100 μm to 300 μm and the chip size of the micro LEDs approximately ranges from 1 μm to 100 μm. This disclosure is not limited thereto.

Figure 2A:
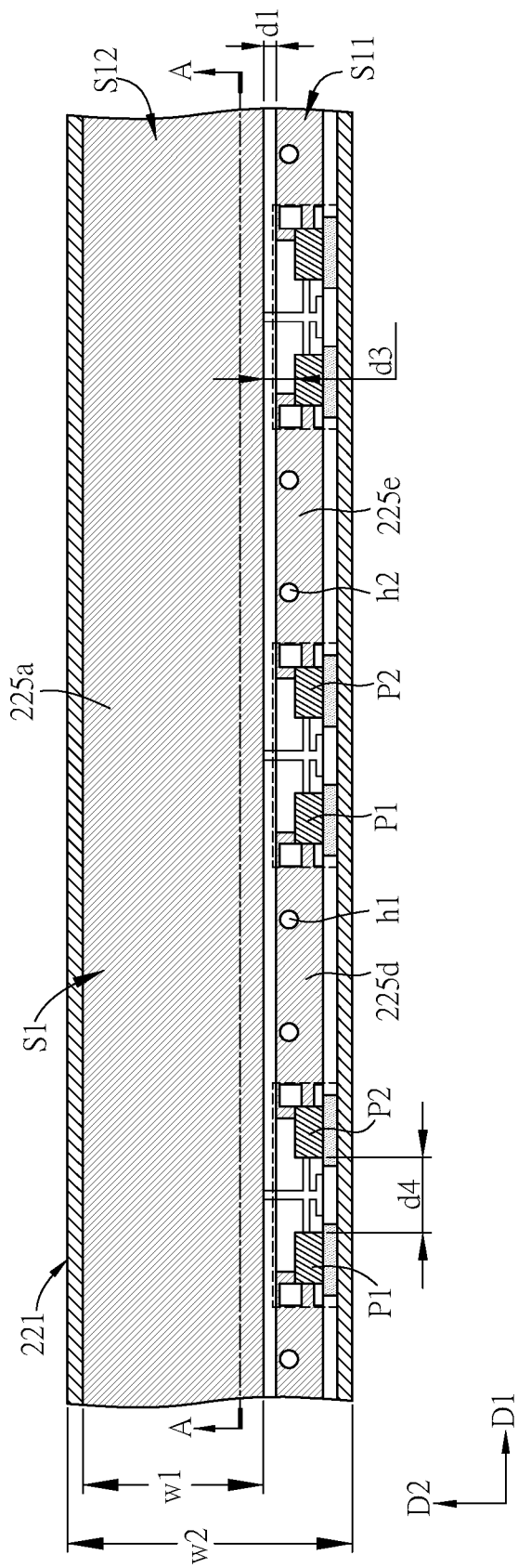
FIG. 2A is a top view of a part of the first surface of the substrate according to an embodiment of this disclosure.
Figure 2B:
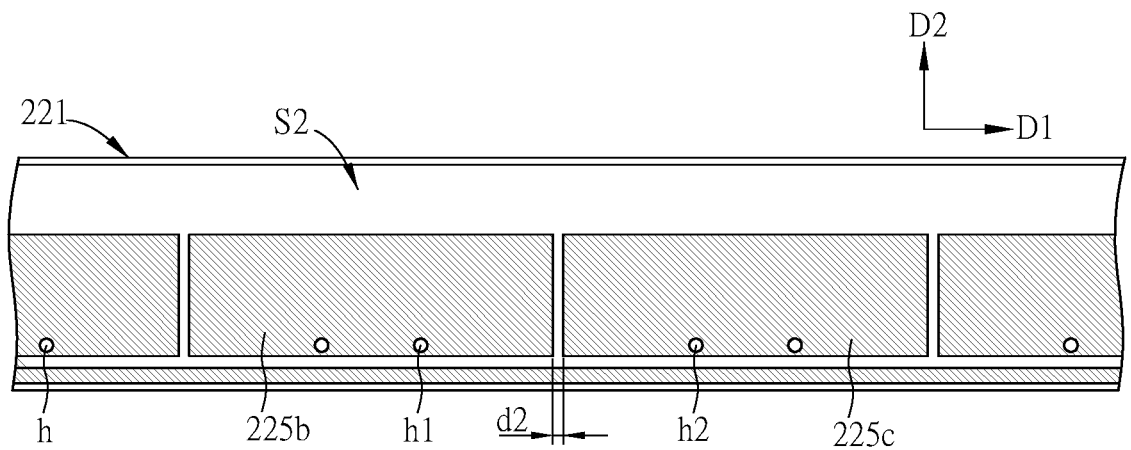
FIG. 2B is a top view of a part of the second surface of the substrate according to an embodiment of this disclosure.
Figure 2C:
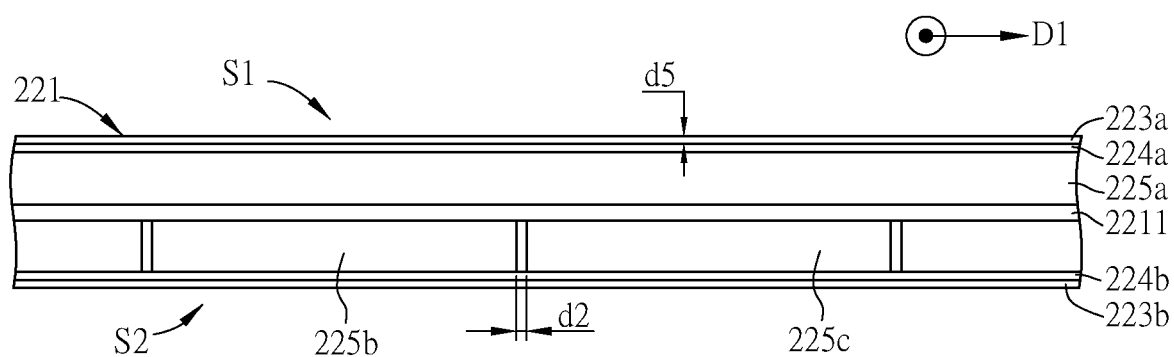
FIG. 2C is a sectional view of the substrate of FIG. 2A along the line A-A.

FIG. 2A is a top view of a part of the first surface of the substrate according to an embodiment of this disclosure, FIG. 2B is a top view of a part of the second surface of the substrate according to an embodiment of this disclosure, and FIG. 2C is a sectional view of the substrate of FIG. 2A along the line A-A. Herein, FIG. 2A shows the top view of a part of the first surface S1 (the front surface) of the substrate 221, and FIG. 2B shows the bottom view of a part of the second surface S2 (the rear surface) of the substrate 221.

Referring to FIGS. 1A, 1B and 2A, in this embodiment, the first surface S1 comprises a component arrangement region S11 and a planar region S12. A first gap d1 is formed between the planar region S12 and the component arrangement region S11, and the planar region S12 and the component arrangement region S11 are electrically isolated from each other. In this embodiments, the planar region S12 and the component arrangement region S11 are electrically isolated by the first gap d1. The first gap d1 can be greater than 0 mm and less than 0.3 mm (0 mm≤d1≤0.3 mm). In some embodiments, the first gap d1 is greater than 0.1 mm and less than 0.2 mm (0.1 mm≤d1≤0.2 mm). For example, the first gap d1 can be 0.15 mm. In one embodiment, an insulation material can be disposed between the planar region S12 and the component arrangement region S11, so the planar region S12 and the component arrangement region S11 can be electrically insulated from each other. The width of the insulation material is equal to the first gap d1. In addition, the first gap d1 has an extension direction. As shown in FIGS. 2A and 2B, the light-emitting elements 222 are arranged along the extension direction, which is the above-mentioned direction D1.

In addition, the component arrangement region S11 comprises a plurality of pairs of electrical connection pads P1 and P2 (see FIG. 2A), so that the two electrodes (not shown) of the light-emitting element 222 can be disposed on the component arrangement region S11 through the corresponding pair of electrical connection pads P1 and P2. In some embodiments, a minimum distance d3 between the planar region S12 and the electrical connection pads P1 and P2 is between 0.075 mm and 0.3 mm (0.075 mm≤d3≤0.3 mm).

The light-guiding plate 21 is disposed on the planar region S12 (see FIG. 1B), and the light-emitting elements 222 are arranged along the direction D1 and disposed on the component arrangement region S11 (see FIGS. 1B and 2A) corresponding to the light input surface 211 of the light-guiding plate 21. In one embodiment, the adhesive member 23 is attached to and disposed on the planar region S12 (see FIG. 1B). The adhesive member 23 can be, for example but not limited to, a double-sided tape or formed by applying and curing an adhesive material. The adhesive member 23 connects the light-guiding plate 21 and the planar region S12, so that the light input surface 211 of the light-guiding plater 21 is disposed facing the light-emitting elements 222.

To be noted, the above-mentioned component arrangement region S11 is a region of the substrate 221 for configuring the light-emitting elements 222 (e.g. LEDs) and/or other elements. The planar region S12 is separated from the component arrangement region S11 by a first gap d1 and is not configured with the light-emitting elements 222. Since the planar region S12 of the substrate 221 is a substantially planar structure, the adhesive member 23 formed on the planar region S12 can also have a substantially planar surface. Accordingly, after the light-guiding plate 21 is disposed on the adhesive member 23, the adhesive member 23 will not be easily peeled.

In one embodiment, the planar region S12 can be a substantially planar surface structure by configuring a filled layer. The filled layer can be an electrical conductive material layer, a polymer material layer, or any of other filled layer. The material having a high electrical conductive property usually also has a high thermal conductive property. Thus, the filled layer made of electrical conductive material can assist the heat dissipation of the light-emitting assembly 22. In some embodiments, the material of the filled layer can be the same as the electrical conductive material (e.g. copper layer) of the component arrangement region S11, and the manufacturing process of the planar region S12 can be the same as the manufacturing process of the component arrangement region S11 for forming the planar region S12. This configuration can reduce the manufacturing cost of the light-emitting assembly 22. In other words, it the materials and/or the manufacturing processes thereof are different, the total manufacturing cost is higher. Of course, in another embodiment, the material of the planar region S12 can be different from the material of the component arrangement region S11. In another embodiment, the Young's modulus of the filled layer ranges from $6\times10^{10}$ Pa (60 Gpa) to $15\times10^{10}$ Pa (150 Gpa). For example, the Young's modulus of the filled layer can be $10\times10^{10}$ Pa (100 Gpa). When the Young's modulus of the filled layer is lower (e.g. $6\times10^{10}$ Pa), the substrate 221 may be easily curved or warped. When the Young's modulus of the filled layer is higher (e.g. $15\times10^{10}$ Pa), the substrate 221 is not easily deformed, so that the stress of impact or shack is substantially absorbed by the reflective member 24 (see FIG. 1A). This can increase the risk of damaging the reflective member 24.

In this embodiment, as shown in FIG. 2A, the planar region S12 has a first width w1 (the width of the filled layer) along a direction D2, which is perpendicular to the extension direction D1. Besides, the substrate 221 has a second width w2 (the width of the base material 2211) along the direction D2. A ratio (w1/w2) of the first width w1 to the second width w2 ranges from 0.20 to 0.85 (0.2≤(w1/w2)≤0.85). In some embodiments, the first width w1 is between 2 mm and 5 mm (e.g. 3.5 mm), and the second width w2 is between 2.35 mm and 25 mm (e.g. 5 mm, 10 mm, or 15 mm). The width (along the direction D2) of the electrical conductive material layer (e.g. copper layer) in the component arrangement region S11 can be between 0.6 mm and 1.2 mm.

Furthermore, referring to FIGS. 2A and 2B in view of FIG. 2C, the substrate 221 of this embodiment comprises a protection layer 223a, an adhesive layer 224a, a filled layer 225a, a base material 2211, and electrical conductive layers 225b and 225c (for example but not limited copper layers). In some embodiments, the substrate 221 can comprise a filled layer 225a and electrical conductive layers 225b and 225c (for example but not limited copper layers). The filled layer 225a and the electrical conductive layers 225b and 225c are disposed on two opposite surfaces of the base material 2211. In some embodiments, the substrate 221 can further comprise a protection layer 223a and an adhesive layer 224a. The adhesive layer 224a is disposed on the filled layer 225a, and the protection layer 223a is disposed on the adhesive layer 224a. For example, the protection layer 223a is correspondingly disposed on the planar region S12. In another embodiment, the substrate 221 can further comprise a protection layer 223b and an adhesive layer 224b. The adhesive layer 224b is disposed on the electrical conductive layer 225b and the electrical conductive layer 225c, and the protection layer 223b is disposed on the adhesive layer 224b. As shown in FIG. 2C, the upper surface of the base material 2211 is defined as a first surface S1, and the lower surface of the base material 2211 is defined as a second surface S2. The protection layer 223a, the adhesive layer 224a and the filled layer 225a are disposed on the upper surface (the first surface S1) of the base material 2211. The electrical conductive layer 225b, the electrical conductive layer 225c, the adhesive layer 224b, and the protection layer 223b are disposed on the lower surface (the second surface S2) of the base material 2211. The protection layer 223a is attached on the filled layer 225a by the adhesive layer 224a for protecting the electrical conductive layer 225a, and the protection layer 223b is attached on the electrical conductive layers 225b and 225c by the adhesive layer 224b for protecting the electrical conductive layers 225b and 225c. The protection layer 223a and the protection layer 223b can comprise the same material or different materials. The protection layer 223a and the protection layer 223b can have the same thickness or different thicknesses. This disclosure is not limited. In some embodiments, the materials of the protection layers 223a and 223b can be, for example but not limited to, epoxy or acrylic.

In some embodiments, as shown in FIG. 2C, the thickness d5 of the protection layer 223a is greater than 0 μm and less than 30 μm (0 μm≤d5≤30 μm). In some embodiments, the thickness d5 of the protection layer 223a is greater than 10 μm and less than 26 μm (10 μm≤d5≤26 μm), such as 25 μm. In the conventional display device, the thickness of the protection layer of the light-emitting assembly is less than 10 µm. In this embodiment, the thicker protection layer 223a is provided to cover the films or layers (filled layer 225a). This configuration can provide a better protection function, but also decrease the influence of the gap (d2 of FIGS. 2B and 2C) between the electrical conductive layers 225b and 225c on the second surface S2 to the planar region S12 of the first surface S1, thereby increasing the flatness of the planar region S12. As a result, the bubbles are not easily formed between the adhesive member 23 and the substrate 221, thereby preventing the peeling off of the adhesive member 23.

Figure 3:
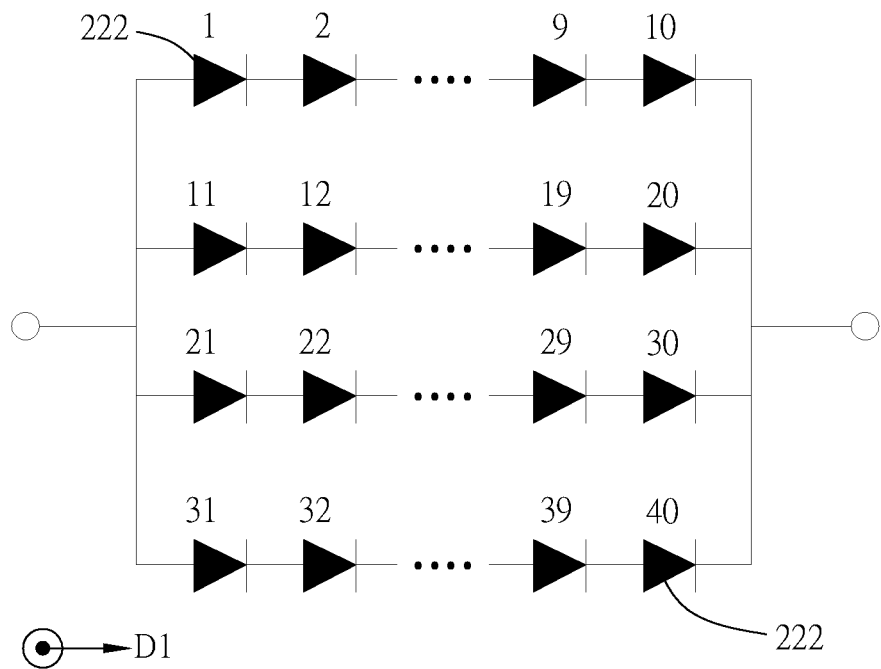
FIG. 3 is a circuit diagram of the light-emitting element according to an embodiment of this disclosure.

Referring to FIGS. 2A to 2C, the electrical conductive layer 225b and the electrical conductive layer 225c disposed on the second surface S2 are electrically isolated from each other, and they are coupled to two electrodes of the light-emitting element 222, respectively. Specifically, the light-emitting elements 222 of this embodiment can be at least partially connected in series. FIG. 3 is a circuit diagram of the light-emitting element 222 according to an embodiment of this disclosure. In this embodiment, a part of the light-emitting elements 222 disposed adjacent to each other are connected in series. For example, the light-emitting assembly 22 comprises forty light-emitting elements 222, and this disclosure is not limited thereto. As shown in FIG. 1B, the forty light-emitting elements 222 (No. 1 light-emitting element, No. 2 light-emitting element, No. 3 light-emitting element, . . . , and No. 40 light-emitting element) are arranged in order along the direction D1. As shown in FIG. 3, the arranged order is labeled on the top of the light-emitting elements 222. For example, the No. 2 light-emitting element 222 is disposed adjacent to the No. 1 light-emitting element 222 and the No. 3 light-emitting element 222. In some embodiments, regarding the electrical connection of the light-emitting elements 222 as shown in FIG. 3, every ten light-emitting elements 222 are electrically connected in series. Accordingly, four sets of light-emitting elements 222 can be obtained, and the four sets of light-emitting elements 222 are electrically connected in parallel. To be noted, as shown in the electrical connection diagram of FIG. 3, the No. 2 light-emitting element 222 is located adjacent to the No. 12 light-emitting element 222, but in the real case, the No. 2 light-emitting element 222 may not be located adjacent to the No. 12 light-emitting element 222. As shown in FIG. 2A, the planar region S12 of the first surface S1 is not configured with traces, and the wires (the electrical conductive layers 225b and 25c of FIG. 2B) connecting to the positive and negative electrodes of the light-emitting element 222 are disposed on the second surface S2 of the substrate 221. The filled layer 225a and the electrical conductive layer 225b are electrically isolated from each other. A second gap d2 is formed between the electrical conductive layers 225b and 225c, and the second gap d2 can be greater than 0 mm and less than 0.3 mm (0 mm ≤d2≤0.3 mm). In some embodiments, the second gap d2 can be greater than 0 mm and less than 0.2 mm (0 mm≤d2≤0.2 mm), such as 0.1 mm.

In one embodiment, as shown in FIG. 2A, the electrical connection pads P1 and P2 can be electrically connected to the electrical conductive layers (225b, 225c) on the second surface S2 through the electrical conductive layers 225d and 225e. In addition, at least one through hole h is disposed in the component arrangement region S11, and an electrical conductive material (not shown) is provided to fill the through hole h, so that the electrical conductive layers of the first surface S1 and the second surface S2 can be electrically connected with each other through the through hole h. Specifically, the electrical conductive layer 225b of the second surface S2 can be electrically connected with the electrical conductive layer 225d of the first surface S1 through the through hole h1 (and the electrical conductive material therein), and the electrical conductive layer 225c of the second surface S2 can be electrically connected with the electrical conductive layer 225e of the first surface S1 through another through hole h2 (and the electrical conductive material therein). Thus, the electrical signals can be transmitted from the electrical conductive layers 225b and 225c of the second surface S2 to the electrical conductive layers 225d and 225e of the first surface S1, respectively, and then be transmitted to the electrical connection pads P1 and P2 and the positive electrodes and the negative electrodes of the light-emitting elements 222. Accordingly, the light-emitting elements 222 can be driven to emit light. To be noted, the films or layers disposed on the planar region S12 of the first surface S1 are not provided for conducting the light-emitting elements 222, so it is not needed to configure the through hole on the planar region S12 for conducting the films or layers on the first surface S1 and the second surface S2 of the substrate 221.

The other structures of the display device 1 will be described hereinafter. With reference to FIG. 1A, the backlight module 2 of this embodiment further comprises a reflective member 24. In addition, the display device 1 of this embodiment can further comprises a back plate 11, at least one optical film 12, a frame 13, and a reflective member 24a.

The back plate 11 can be, for example but not limited to, a metal member or a plastic member, and is configured to support the backlight module 2 and prevent the impact or damage of the backlight module 2. The reflective member 24 is disposed between the back plate 11 and the light-guiding plate 21, and is configured to reflect the light outputted from the bottom surface 213 of the light-guiding plate 21 back to the light-guiding plate 21. This configuration can increase the light utility. The frame 13 is disposed at one side of the light-emitting assembly 22 away from the light-guiding plate 21, and the supporting portion 131 of the frame 13 supports the display panel 3. Accordingly, the display panel 3 can be disposed correspondingly to the backlight module 2, and the light-emitting assembly 22 and the light-guiding plate 21 can be disposed between the supporting portion 131 and the back plate 11. In addition, the reflective member 24a is disposed between the supporting portion 131 and the light-emitting assembly 22. The relative positions and technical contents of the light-emitting assembly 22 and the light-guiding plate 21 can be referred to the above embodiments. The reflective member 24 or 24a can be a reflective plate, a reflective sheet, a reflective film, or a coated film or layer having the reflective function. In this embodiment, the reflective member 24 or 24a can be a reflective sheet for example. The reflective member 24 or 24a contains the reflective material, which comprises, for example but not limited to, metal, metal oxide, high-reflective paint (white paint), or their combinations.

At least one optical film 12 between the light-guiding plate 21 and the display panel 3. The optical film 12 can be, for example but not limited to, a brightness enhancement film, prism film, or a diffuser. In practice, the light output surface 212 can be configured with a plurality of optical films 12 based on the application of the backlight module 2. For example, FIG. 1A shows four optical films 12. The number or application of the optical films 12 is not limited in this disclosure.

In the display device 1 of this disclosure, the planar region S12 of the substrate 221 is a substantially planar structure, so the adhesive member 23 attached to and disposed on the planar region S12 can also form a substantially planar surface. Since the planar region S12 is a substantially planar structure, the bubbles can be prevented to be formed between the adhesive member 23 and the substrate 221. Accordingly, after the light-guiding plate 21 is disposed on the adhesive member 23, the adhesive member 23 will not be easily peeled. This configuration can solve the non-uniform brightness issue (hotspots) of the display device 1 or enhance the optical performance thereof.

Figure 4A:
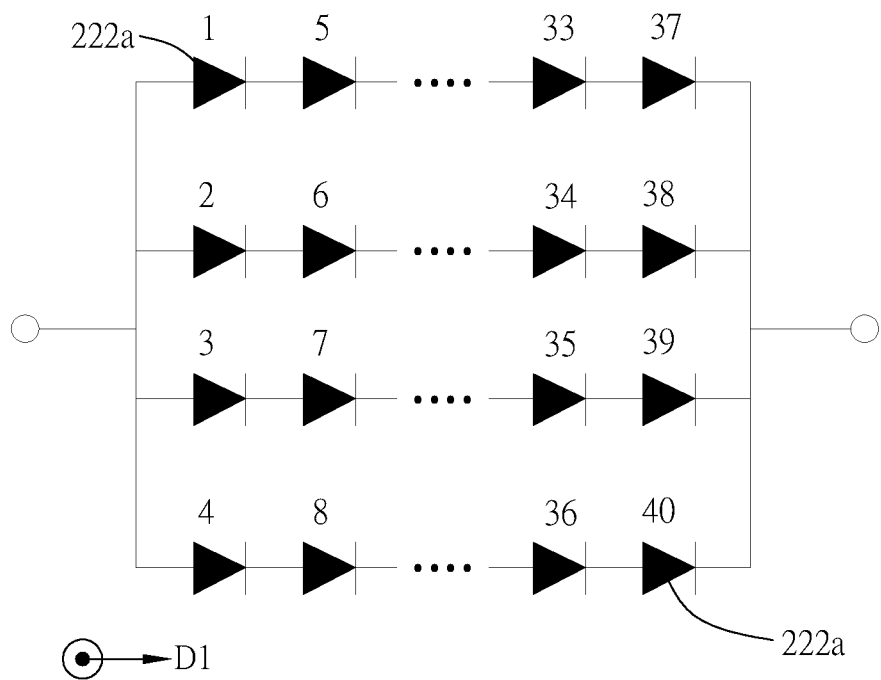
FIG. 4A is a circuit diagram of the light-emitting element according to another embodiment of this disclosure.
Figure 4B:
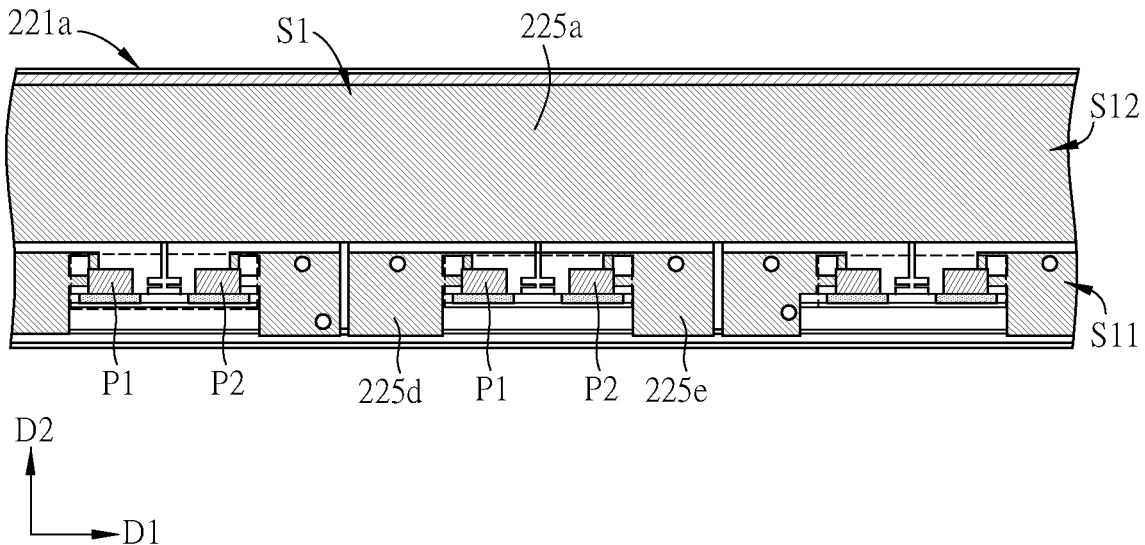
FIG. 4B is a top view of a part of the front surface of the substrate according to another embodiment of this disclosure.

FIG. 4A is a circuit diagram of a light-emitting element 222a according to another embodiment of this disclosure, and FIG. 4B is a top view of a part of the front surface of a substrate 221a according to another embodiment of this disclosure. The circuit diagram of FIG. 4A shows that the light-emitting elements 222a are crossingly connected, and FIG. 4B shows the top view of a part of the front surface of the substrate 221a when the light-emitting elements 222a are crossingly connected.

As shown in FIG. 4A, the display device also comprises forty light-emitting elements 222a. In some embodiments, a part of the light-emitting elements 222a disposed adjacent to each other are connected in parallel. For example, the forty light-emitting elements 222a (No. 1 light-emitting element, No. 2 light-emitting element, No. 3 light-emitting element, . . . , and No. 40 light-emitting element) are arranged in order along the direction D1. As shown in FIG. 4A, the arranged order is labeled on the top of the light-emitting elements 222a. For example, the No. 2 light-emitting element 222a is disposed adjacent to the No. 1 light-emitting element 222a. In some embodiments, the term "crossingly connection" represents that the forty light-emitting elements 222a with non-continuous numbers are connected in series along the direction D1. For example, the No. 1 light-emitting element 222a, No. 5 light-emitting element 222a, . . . , No. 33 light-emitting element 222a, and No. 37 light-emitting element 222a are connected in series (totally ten light-emitting elements 222a are connected in series), the No. 2 light-emitting element 222a, No. 6 light-emitting element 222a, . . . , No. 34 light-emitting element 222a, and No. 38 light-emitting element 222a are connected in series (totally ten light-emitting elements 222a are connected in series), and so on. Accordingly, four sets of serial connected light-emitting elements can be obtained, and then the four sets of serial connected light-emitting elements are connected in parallel. As shown in FIG. 4B, similarly, the planar region S12 of the first surface S1 is not configured with traces. Different from the embodiment of FIG. 2A, in the embodiment of FIG. 4B, the component arrangement region S11 extends toward the direction away from the planar region S12, and the extension area of the component arrangement region S11 is configured for disposing the traces used in the crossingly connection of the light-emitting elements 222. The other technical features of the substrate 221a can be referred to the same components of the above-mentioned substrate 221.

Figure 4C:
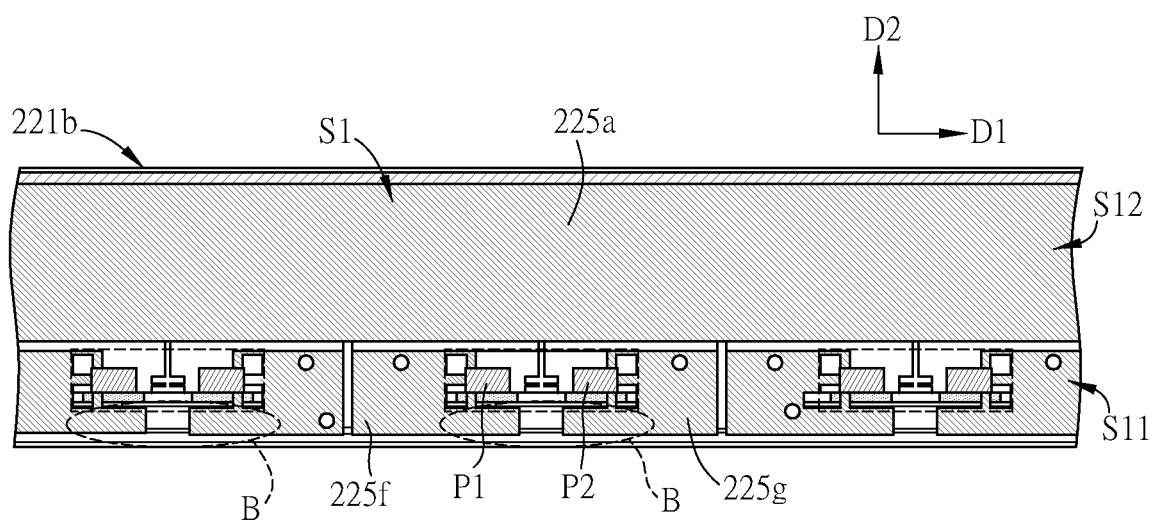
FIG. 4C is a top view of a part of the front surface of the substrate according to another embodiment of this disclosure.

FIG. 4C is a top view of a part of the front surface of the substrate 221b according to another embodiment of this disclosure. The substrate 221b is substantially the same as the substrate 221a of FIG. 4B. Different from the substrate 221a, the electrical conductive layers 225f and 225g of the substrate 221b are configured with a larger area (including the extra area B). The electrical conductive layers 225f and 225g disposed in the area B also connected to the electrical connection pads P1 and P2, respectively, for enhancing the transmission efficiency of the power source (the current loss is smaller due to the smaller impedance).

Figure 5A:
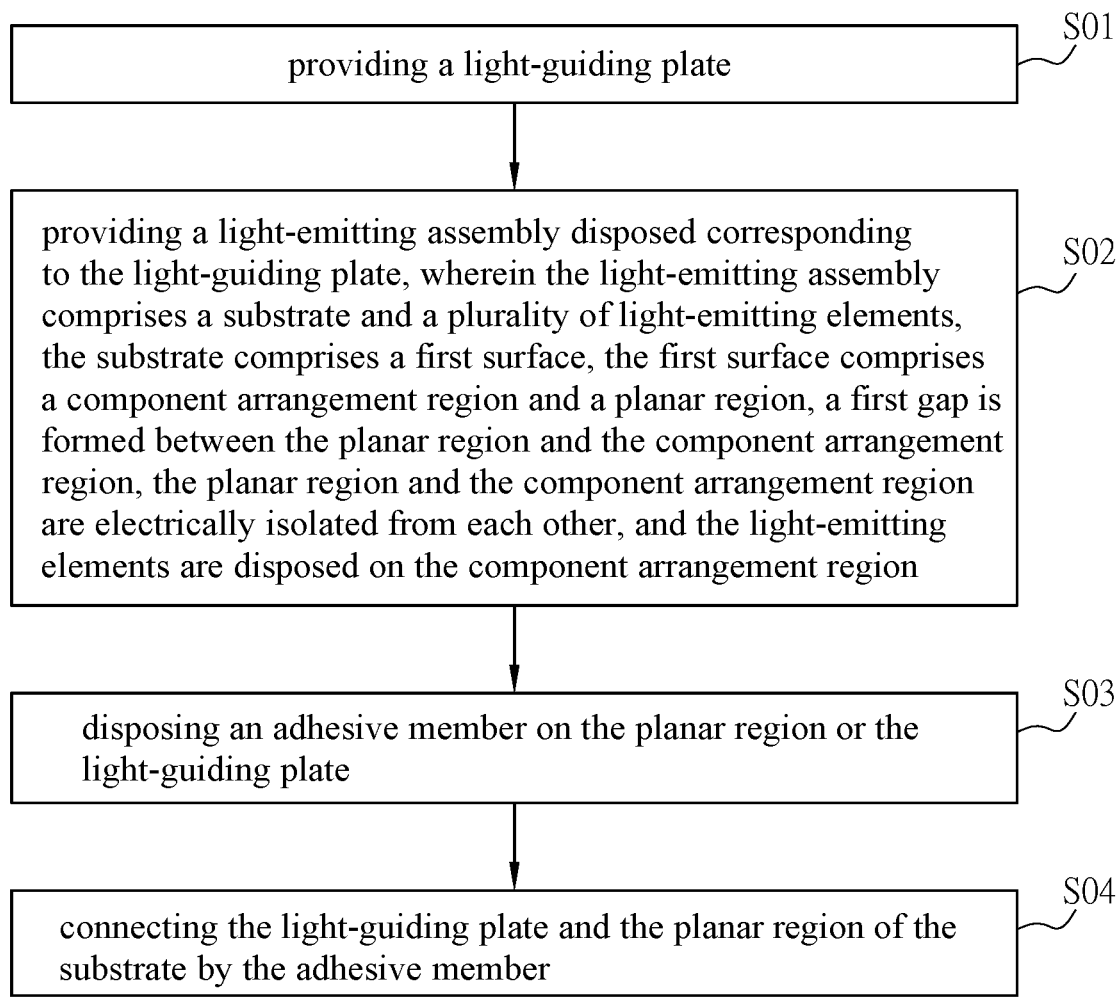
FIGS. 5A and 5B are flow charts showing the assembling procedure of the display device according to an embodiment of this disclosure.
Figure 5B:
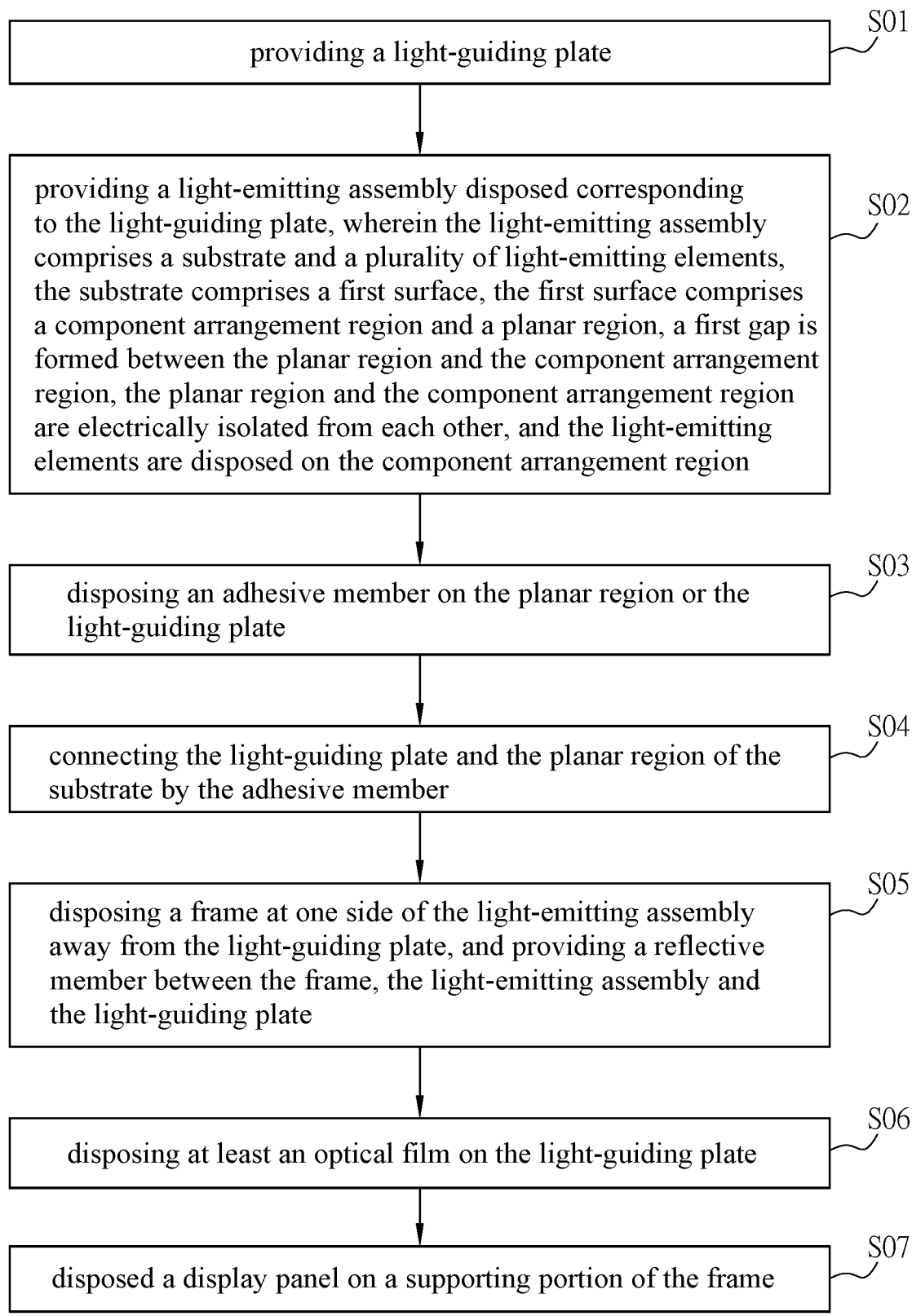

The assembling procedure of the display device according to an embodiment of this disclosure will be described hereinafter with reference to FIGS. 5A and 5B in view of FIGS. 1A and 2A. FIGS. 5A and 5B are flow charts showing the assembling procedure of the display device 1 according to an embodiment of this disclosure. To be noted, additional embodiments of this disclosure can be carried out by adding a step or steps, reducing a step or steps, or adjusting the order of steps in the assembling procedure of FIGS. 5A and 5B.

As shown in FIGS. 1A, 2A and 5A, the assembling method of the display device 1 comprises: providing a light-guiding plate 21 (step S01); providing a light-emitting assembly 22 disposed correspondingly to the light-guiding plate 21, wherein the light-emitting assembly 22 comprises a substrate 221 and a plurality of light-emitting elements 222, the substrate 221 comprises a first surface S1, the first surface S1 comprises a component arrangement region S11 and a planar region S12, a first gap d1 is formed between the planar region S12 and the component arrangement region S11, the planar region S12 and the component arrangement region S11 are electrically isolated from each other, and the light-emitting elements 222 are disposed on the component arrangement region S11 (step S02); disposing an adhesive member 23 on the planar region S12 or the light-guiding plate 21 (step S03); and disposing the light-guiding plate 21 on the planar region S12 and connecting the light-guiding plate 21 and the planar region S12 of the substrate 221 by the adhesive member 23 (step S04). In some embodiments, the light-emitting assembly 22 can be disposed on the back plate 11. The light-emitting assembly 22 can be assembled in advance and then disposed on the back plate 11. Afterwards, the reflective member 24 can be optionally disposed on the back plate 11, so the reflective member 24 can be disposed adjacent to the light-emitting assembly 22. In some embodiments, the step S02 can further dispose the adhesive member 23 on the planar region S12, and the step S03 can be removed.

In addition, as shown in FIG. 5B, the assembling method of the display device 1 can further comprise: disposing a frame 13 at one side of the light-emitting assembly 22 away from the light-guiding plate 21, and providing a reflective member 24a between the frame 13 and the light-emitting assembly 22 (step S05). Herein, the reflective member 24a can be disposed under the supporting portion 131 of the frame 13, and then the frame 13 along with the reflective member 24a can be moved to the light-emitting assembly 22 and the light-guiding plate 21, thereby disposing the reflective member 24a between the supporting portion 131 and the back plate 11. Moreover, the assembling method of the display device 1 can further comprise: disposing at least an optical film 12 on the light-guiding plate 21 (step S06); and disposed a display panel 3 on the supporting portion 131 of the frame 13 (step S07). Accordingly, the display panel 3 can be disposed correspondingly to the backlight module 2.

Figure 6:
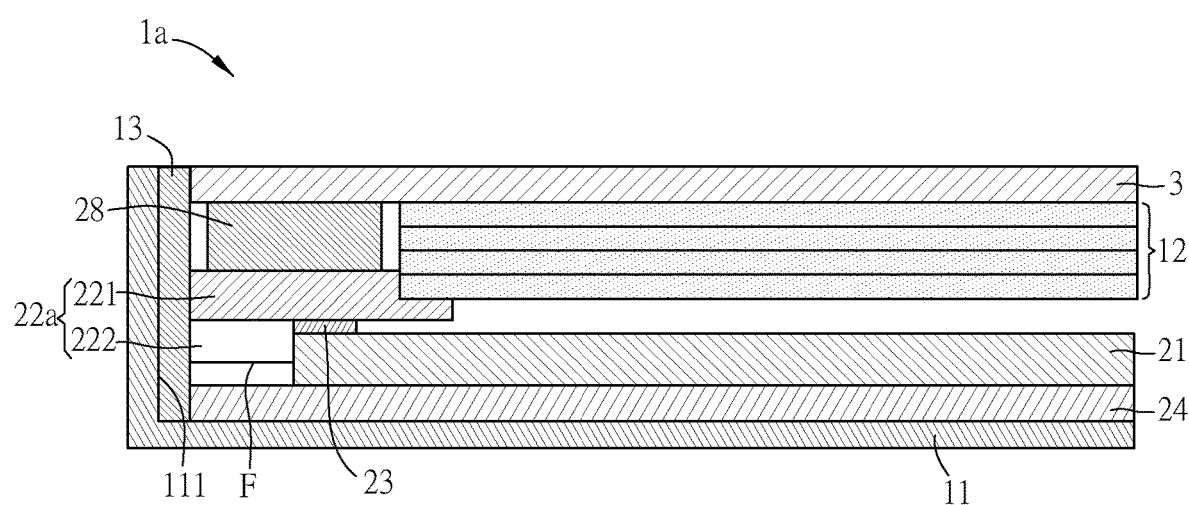
FIG. 6 is a schematic diagram showing a display device according to another embodiment of this disclosure.

FIG. 6 is a schematic diagram showing a display device 1a according to another embodiment of this disclosure. The assembling procedure of the display device 1a as shown in FIG. 6 comprises: disposing a reflective member 24 on a back plate 11; disposing a frame 13 on the back plate 11 and attaching the frame 13 on the inner side wall 111 of the back plate 11; assembling a light-guiding plate 21, an adhesive member 23, a light-emitting assembly 22a and another adhesive member 28 (e.g. a shielding tape), wherein the light-emitting elements 222 are disposed away from the surface F of the substrate 221, facing downwardly, and configured on the reflective member 24 (i.e. the light-emitting assembly 22a is reversed on the reflective member 24), and the reflective member 24 is disposed between the light-guiding plate 21 and the back plate 11; disposing at least an optical film 12 on the light-guiding plate 21, wherein the substrate 221 of the light-emitting assembly 22a supports the at least one optical film 12; and disposing a display panel 3 on the adhesive member 18 and the at least one optical film 12, wherein the optical film 12 is disposed between the display panel 3 and the light-guiding plate 21.

As mentioned above, in the display device and assembling method thereof of this disclosure, the first surface of the substrate of the backlight module comprises a component arrangement region and a planar region, the planar region and the component arrangement region are electrically isolated from each other by a gap disposed therebetween, and the adhesive member connects the light-guiding plate and the planar region. Since the planar region of the substrate is a substantially planar structure, the bubbles can be prevented to be formed in the adhesive member so as to obtain a substantially planar surface. Accordingly, after the light-guiding plate is disposed on the adhesive member, the adhesive member will not be easily peeled, thereby solving the non-uniform brightness issue (hotspots) or enhancing the optical performance.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A light-emitting assembly comprises:
   a substrate comprising a component arrangement region and a planar region in a top view; and in a sectional view comprising a base material layer, a filled layer disposed on the base material layer, and a protection layer disposed on the filled layer;
   wherein a thickness of the filled layer is greater than a thickness of the protection layer, and the thickness of the protection layer is greater than 0 μm and less than 30 μm; and
   a plurality of light-emitting elements located on the component arrangement region.

2. The light-emitting assembly according to claim 1, wherein the plurality of light-emitting elements are arranged along an extension direction, wherein the planar region of the substrate has a first width along a direction perpendicular to the extension direction, the substrate has a second width along the direction, and a ratio of the first width to the second width ranges from 0.20 to 0.85.

3. The light-emitting assembly according to claim 1, wherein a first gap is formed between the planar region and the component arrangement region of the substrate, and the first gap is greater than 0 mm and less than 0.3 mm.

4. The light-emitting assembly according to claim 1, further comprising at least one of electrical connection pads, wherein a minimum distance (d3) between the planar region of the substrate and the at least one of the electrical connection pads is between 0.075 mm and 0.3 mm (0.075 mm≤d3≤0.3 mm).

5. The light-emitting assembly according to claim 1, wherein a part of the plurality of light-emitting elements disposed adjacent to each other are electrically connected in series.

6. The light-emitting assembly according to claim 1, wherein a part of the plurality of light-emitting elements disposed adjacent to each other are electrically connected in parallel.

7. The light-emitting assembly according to claim 1, wherein the substrate further comprises an electrical conductive layer and the electrical conductive layer is disposed on two opposite surfaces of the base material layer.

8. The light-emitting assembly according to claim 1, wherein the filled layer is an electrical conductive material layer.

9. The light-emitting assembly according to claim 8, wherein the material of the filled layer is the same as the electrical conductive material of the component arrangement region.

10. The light-emitting assembly according to claim 1, wherein the substrate further comprises an adhesive layer disposed between the filled layer and the protection layer.

11. The light-emitting assembly according to claim 1, wherein the light-emitting assembly is disposed correspondingly to a light-guiding plate.

12. The light-emitting assembly according to claim 11, wherein the light-guiding plate comprises a light input surface and a light output surface.

13. The light-emitting assembly according to claim 12, wherein the plurality of light-emitting elements are located correspondingly to the light input surface of the light-guiding plate.

14. The light-emitting assembly according to claim 13, wherein a light emitted from the light-emitting assembly enters the light-guiding plate through the light input surface, and exits the light-guiding plate through the light output surface.

15. The light-emitting assembly according to claim 11, wherein the light-guiding plate is partially disposed on the planar region.

16. The light-emitting assembly according to claim 15, wherein the light-guiding plate connects the planar region by an adhesive member.

* * * * *